(12) United States Patent
Xiong et al.

(10) Patent No.: US 9,950,559 B2
(45) Date of Patent: Apr. 24, 2018

(54) MULTILAYERED LAMINATE AND PROCESS FOR PREPARING THE SAME

(71) Applicant: Valspar Sourcing, Inc., Minneapolis, MN (US)

(72) Inventors: Rong Xiong, Foshan (CN); Gang Duan, Northbrook, IL (US); Hui Kou, Minneapolis, MN (US); Ronghai Hu, Foshan (CN); Hengsheng Hu, Foshan (CN)

(73) Assignee: Valspar Sourcing, Inc., Minneapolis, MN (US)

( * ) Notice: Subject to any disclaimer, the term of this patent is extended or adjusted under 35 U.S.C. 154(b) by 56 days.

(21) Appl. No.: 14/645,605

(22) Filed: Mar. 12, 2015

(65) Prior Publication Data

US 2015/0183265 A1    Jul. 2, 2015

Related U.S. Application Data (63) Continuation of application No. PCT/US2013/062206, filed on Sep. 27, 2013.

(30) Foreign Application Priority Data

Sep. 28, 2012    (CN) .......................... 2012 1 0388216

(51) Int. Cl.
    *B44F 9/04*       (2006.01)
    *C09D 5/14*       (2006.01)
    (Continued)

(52) U.S. Cl.
    CPC ................ *B44F 9/04* (2013.01); *B32B 37/24* (2013.01); *C09D 5/002* (2013.01); *C09D 5/14* (2013.01);
    (Continued)

(58) Field of Classification Search
    CPC . B05D 1/286; B05D 5/06; B05D 7/57; B05D 7/5723; B32B 13/00
    (Continued)

(56) References Cited

U.S. PATENT DOCUMENTS

| 3,928,706 A | 12/1975 | Gibbons |
| 5,994,530 A | 11/1999 | Posey-Dowty |

(Continued)

FOREIGN PATENT DOCUMENTS

| CN | 101015972 A | 8/2007 |
| EP | 0487724 A1 | 6/1992 |

(Continued)

OTHER PUBLICATIONS

International Search Report and Written Opinion of International Application No. PCT/US2013/062206 dated Feb. 12, 2014. (10 pages).

*Primary Examiner* — Frank D Ducheneaux
(74) *Attorney, Agent, or Firm* — James C. Scott (57) ABSTRACT

This disclosure is directed to a multilayered laminate, comprising (a) a support substrate having at least one releasable major surface; (b) a transparent overcoat formed of a first coating composition on the releasable major surface of the support substrate, wherein the first coating composition comprises an aqueous polymer dispersion having a particle size in the range of 30 to 400 nm; (c) a stone-like topcoat system on the transparent overcoat, wherein the stone-like topcoat system comprises a multicolored spot layer and a background color layer; (d) an adhesive primer coat formed of a second coating composition on the stone-like topcoat system, wherein the second coating composition comprises an aqueous polymer dispersion selected from aqueous acrylic dispersions, aqueous organic silicone dispersions and aqueous vinyl acetate dispersions, wherein the transparent (Continued)

overcoat in the multilayered laminate, when released from the support substrate, a gloss of at least 60% at 60°.

12 Claims, 1 Drawing Sheet

(51) Int. Cl.

| | |
|---|---|
| *B05D 5/06* | (2006.01) |
| *B32B 37/24* | (2006.01) |
| *C09J 7/02* | (2006.01) |
| *C09J 131/04* | (2006.01) |
| *C09J 133/00* | (2006.01) |
| *C09J 183/04* | (2006.01) |
| *C08K 5/54* | (2006.01) |
| *C09D 5/00* | (2006.01) |
| *C09D 7/12* | (2006.01) |
| *B32B 37/12* | (2006.01) |
| *E04F 13/08* | (2006.01) |
| *B05D 7/00* | (2006.01) |
| *B05D 1/28* | (2006.01) |

(52) U.S. Cl.
CPC .......... *C09D 7/1216* (2013.01); *C09J 131/04* (2013.01); *C09J 133/00* (2013.01); *C09J 183/04* (2013.01); *B05D 1/286* (2013.01); *B05D 5/06* (2013.01); *B05D 7/57* (2013.01); *B05D 7/5723* (2013.01); *B32B 37/1284* (2013.01); *B32B 2037/243* (2013.01); *B32B 2250/05* (2013.01); *B32B 2309/10* (2013.01); *B32B 2315/18* (2013.01); *B32B 2317/16* (2013.01); *B32B 2419/00* (2013.01); *C08K 5/54* (2013.01); *C08L 2201/54* (2013.01); *C09J 7/0235* (2013.01); *C09J 7/0296* (2013.01); *C09J 2201/162* (2013.01); *C09J 2205/102* (2013.01); *C09J 2431/00* (2013.01); *C09J 2433/00* (2013.01); *C09J 2483/00* (2013.01); *E04F 13/0873* (2013.01); *Y10T 428/25* (2015.01); *Y10T 428/2839* (2015.01); *Y10T 428/2891* (2015.01)

(58) Field of Classification Search
USPC ........................................................ 156/247
See application file for complete search history.

(56) References Cited

U.S. PATENT DOCUMENTS

| | | | |
|---|---|---|---|
| 6,114,008 | A | 9/2000 | Eby et al. |
| 6,309,497 | B1 | 10/2001 | Gordon et al. |
| 7,407,545 | B2 | 8/2008 | Wallner |
| 8,514,354 | B2 | 8/2013 | Amimori et al. |
| 2004/0052957 | A1 | 3/2004 | Cramer et al. |
| 2004/0159969 | A1 | 8/2004 | Truog et al. |
| 2009/0250164 | A1 | 10/2009 | Carrle et al. |
| 2009/0274846 | A1* | 11/2009 | Wada .............. C08G 18/6254 427/407.1 |
| 2010/0055371 | A1 | 3/2010 | Edwards et al. |
| 2011/0045453 | A1 | 2/2011 | Bender et al. |
| 2012/0207997 | A1 | 8/2012 | Liang et al. |

FOREIGN PATENT DOCUMENTS

| | | |
|---|---|---|
| FR | 2822752 A1 | 10/2002 |
| WO | 03097348 A1 | 11/2003 |
| WO | 2004074003 A2 | 2/2004 |
| WO | 2004073967 A2 | 9/2004 |
| WO | 2004074004 A1 | 9/2004 |
| WO | 2004074008 A2 | 9/2004 |
| WO | 2005003486 A1 | 1/2005 |
| WO | 2005030495 A2 | 4/2005 |
| WO | 2006121623 A1 | 11/2006 |
| WO | 2009110870 A1 | 9/2009 |
| WO | 2010024274 A1 | 3/2010 |
| WO | 2012009514 A1 | 1/2012 |

* cited by examiner

MULTILAYERED LAMINATE AND PROCESS FOR PREPARING THE SAME

CROSS REFERENCE TO RELATED APPLICATION(S)

This application is a continuation of International Application No. PCT/US2013/062206, filed Sep. 27, 2013, which claims priority from Chinese Application No. 201210388216.0, filed Sep. 28, 2012, each of which is incorporated herein by reference in its entirety.

TECHNICAL FIELD

The present disclosure relates to a multilayered laminate and process for the preparation thereof, and in particular to a multilayered laminate capable of providing high gloss and also a stone-like effect (viz., a stone-like appearance) to a target substrate, especially architectural materials and wood-based substrates.

BACKGROUND

In order to provide a target substrate e.g., architectural materials with various characteristics, such as stain resistance, weatherability, resistance to heat and cold, resistance to water and oil, resistance to chemical, color effect (including stone-like effect), high gloss or other visual effect, a multilayer structure consisting of two or more layers may be applied. For example, to provide a target substrate with a stone-like effect, a flexible stone-like layer is applied to the surface of the target substrate and a transparent rigid layer having a comparatively high modulus of elasticity is applied over the flexible stone-like layer. In such a multilayer structure, an outer layer functions as an overcoat for shielding external force and an inner layer maintains its stone-like effect.

A topcoat finish of high gloss is usually applied in order to further improve the aesthetic property of the target substrate. The final gloss of a coating, however, depends on many parameters that can be difficult to control. For example, the properties of the coating solution itself, such as the resin binders used in the formulation, the formulation viscosity and the flatting pigment loading, can have an impact on the topcoat's final gloss level. In addition, cure conditions such as curing speed, temperature, oxygen inhibition and the like, have an impact on the gloss in the final coating product.

SUMMARY

In view of the demands for the appearance and gloss of a target substrate such as architectural materials, there is a strong need for a convenient and yet efficient process for providing the target substrate with a high gloss and as well stone-like effect.

To meet the demands as mentioned above, the present disclosure in one aspect provides a multilayered laminate, which is capable of providing a target substrate with a high gloss and as well a stone-like effect, the laminate comprising
  (a) a support substrate having at least one releasable major surface;
  (b) a transparent overcoat formed of a first coating composition on the releasable major surface of the support substrate, wherein the first coating composition comprises an aqueous polymer dispersion having a particle size in the range of 30 to 400 nm;
  (c) a stone-like topcoat system on the transparent overcoat, wherein the stone-like topcoat system comprises a multicolored spot layer and a background color layer;
  (d) an adhesive primer coat formed of a second coating composition on the stone-like topcoat system, wherein the second coating composition comprises an aqueous polymer dispersion selected from aqueous acrylic dispersions, aqueous organic silicone dispersions and aqueous vinyl acetate dispersions,
wherein the transparent overcoat in the multilayered laminate, when released from the support substrate, has a gloss of at least 60% at 60°.

In an embodiment, the multicolored spot layer is formed from a third coating composition comprising color concentrate particles protected by a hydrophilic clay colloid and having one or more hues. In a specific embodiment, the color concentrate particles protected by a hydrophilic clay colloid are formed by mixing a protective hydrophilic clay into deionized water to form a hydrophilic clay colloid and mixing and granulating the hydrophilic clay colloid with a colored latex paint, in which the protective hydrophilic clay, deionized water and the colored latex paint are present in a mass ratio of 1:5-15:5-15. In an embodiment, the background color layer is formed from a fourth coating composition comprising mineral powders in the form of discrete particles.

In another aspect the present disclosure provides a process for the preparation of the multilayered laminate, comprising
  (i) providing a support substrate having at least one releasable major surface;
  (ii) applying a first coating composition on the releasable major surface of the support substrate, to form a transparent overcoat, wherein the first coating composition comprises an aqueous polymer dispersion having a particle size in the range of 30 to 400 nm;
  (iii) by wet on dry application process, forming a multicolored spot layer and a background color layer in turn on the transparent overcoat, thereby forming a stone-like topcoat system;
  (iv) by wet on dry application process, applying a second coating composition on the stone-like topcoat system, to form an adhesive primer coat, wherein the second coating composition comprises an aqueous polymer dispersion selected from aqueous acrylics dispersion, aqueous organic silicones dispersion and aqueous vinyl acetates dispersion, thereby obtaining the multilayered laminate,
wherein the transparent overcoat in the multilayered laminate, when released from the support substrate, has a gloss of at least 60% at 60°.

In still another aspect the present disclosure provides a process for coating a target substrate, comprising
  (i) adhering the above-mentioned adhesive primer coat in the multilayered laminate according to the present invention or obtained by the inventive process to the surface of the target substrate;
  (ii) releasing the above-mentioned support substrate from the multilayered laminate, thereby obtaining a coated substrate having a stone-like effect and a gloss of at least 60% at 60°.

In a particular embodiment, the target substrate may be an architectural material, which may comprise concrete mass, plaster board, lime-sand brick, aerated concrete, lightweight multilayer plate, fiber cement board or any combination thereof, or a wood substrate, which may comprise a natural wood substrate, a synthetic or engineered wood-based substrate, or any combination thereof.

It has been surprisingly found by the inventors that a coating system can be obtained with a stone-like effect and also a high gloss by adhering the adhesive primer coat from the multilayered laminate as disclosed herein to the surface of the target substrate, and thereafter peeling off the support substrate from the laminate.

It is believed that the final gloss of a coating depends on many parameters that can be difficult to control. As a result, it is always difficult to achieve a high-gloss coating surface by the conventional application processes. Surprisingly, it has been found that the transparent overcoat from which the support substrate has been released can achieve a desirable gloss, e.g., a gloss of at least 60% at 60°, by copying the surface property of the releasable major surface(s) of the support substrate which is preferably smooth in a repeatable and convenient manner.

It has also been found by the inventors that the multilayered laminate as disclosed herein may be provided as a separate product in the form of a solid sheet, so it is easier to handle and store than a conventional wet coating. Furthermore, the multilayered laminate as disclosed herein can be easily applied onto a target substrate by adhering it to the surface of the target substrate and then releasing the support substrate, so it is possible to realize better in-situ quality control than a conventional wet coating, thus leading to an improved product quality.

SELECTED DEFINITIONS

As used herein, "a", "an", "the", "at least one", and "one or more" are used interchangeably. Thus, for example, a coating composition that comprises "an" additive can be interpreted to mean that the coating composition includes "one or more" additives.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this disclosure, as along as such components or steps do not affect the basic and novel characteristics of the invention, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

The phrase, "wet on dry application process", as used in the context of "applying a coating composition", means that an overlying coating composition is applied on an underlying coating layer which is at least surface dry (dry-to-touch).

The phrase "substantially free" of volatile organic chemicals (VOCs), as used in the context of a releasable paper, means that the releasable paper contains less than 1,000 parts per million (ppm) of the VOCs. The phrase "essentially free" of VOCs means that the releasable paper contains less than 100 parts per million (ppm) of the VOCs. The phrase "essentially completely free" of VOCs means that the releasable paper contains less than 5 parts per million (ppm) of the VOCs. The phrase "completely free" of phrase means that the releasable paper contains less than 20 parts per billion (ppb) of the VOCs.

The prefixes, such as first, second, third and fourth, as used in the context of a coating composition, are intended to distinguish a designated coating composition from other coating compositions, and without any other limiting purpose.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DETAILED DESCRIPTION

In one aspect the present disclosure is directed to a multilayered laminate, comprising
  (a) a support substrate having at least one releasable major surface;
  (b) a transparent overcoat formed of a first coating composition on the releasable major surface of the support substrate, wherein the first coating composition comprises an aqueous polymer dispersion having a particle size in the range of 30 to 400 nm;
  (c) a stone-like topcoat system on the transparent overcoat, wherein the stone-like topcoat system comprises a multicolored spot layer and a background color layer;
  (d) an adhesive primer coat formed of a second coating composition on the stone-like topcoat system, wherein the second coating composition comprises an aqueous polymer dispersion selected from aqueous acrylic dispersions, aqueous organic silicone dispersions and aqueous vinyl acetate dispersions,
wherein the transparent overcoat in the multilayered laminate, when released from the support substrate, has a gloss of at least 60% at 60°.

In preferred embodiments, the transparent overcoat in the multilayered laminate, when released from the support substrate, has a gloss of at least 65%, at least 70%, at least 80%, at least 85% or even at least 90% at 60°.

In another preferred embodiment, the adhesive primer in the multilayered laminate has an adhesive strength when measured by the adhesive strength measurement method of GB/T 9779-2005 of 0.7 MPa or more.

Support Substrate

The support substrate may be a film or sheet of any suitable material having a thickness sufficient to perform the function of supporting the remainder of the multilayer laminate. For a particular type of material used for a support substrate, a person skilled in the art can easily determine a suitable support substrate thickness. The length or width of the support substrate is not particularly limited, and may be suitably selected as practically desired. In an embodiment, the support substrate can be provided in a form of coil with a fixed width and any desired length.

In the multilayered laminate as disclosed herein, the support substrate has at least one releasable major surface, preferably two oppositely-disposed releasable major surfaces. The term "major surface" as used herein means a surface that is defined by the major dimensions, i.e., the lengthwise and widthwise dimensions of the substrate. The term "releasable" as used herein means that when the transparent overcoat in the multilayered laminate is released from the support substrate, such releasing can be readily performed manually without any occurrence of blocking or other disadvantageous interactions. Measures known in the art can be employed to provide a support substrate with a releasable surface. In particular, the releasable surface can be obtained by applying a release agent to a major surface of the support substrate. Additionally or alternatively, depending on the nature of the materials used for a support substrate, the major surface of the substrate as such is a releasable surface, making it optional or unnecessary to apply any release agent.

Preferably, the releasable major surface of the support substrate is smooth. The term "smooth" as used herein means that the releasable major surface has minimal or low roughness. In particular, the releasable major surface of the support substrate is smooth such that the transparent overcoat in the multilayered laminate, having been released from the releasable major surface of the support substrate, can achieve a gloss of at least 60% or even more at 60°. Thus the support substrate as disclosed herein can perform not only the function of support, but also can provide an adjacent layer, such as the transparent overcoat applied on the support substrate, with desirable surface properties (for example, high gloss) after the support substrate has been removed from the multilayered laminate. Without wishing to be bound by theory, we believe that the adjacent layer, such as the transparent overcoat applied on the releasable major surface of the support substrate, can achieve the desirable high gloss after release from the releasable major surface by copying surface properties such as the smoothness of the releasable major surface.

In an embodiment, the support substrate comprises a film of a polymeric material, such as polyester film, polyethylene film, polypropylene film, polyethylene terephthalate (PET) film, or polyvinyl chloride (PVC) film, or a film of any other suitable material known in the art. In another embodiment, the support substrate comprises releasable paper. Suitable examples of the releasable paper will be known to a person skilled in the art, and are commercially available. Preferably, the releasable paper is substantially free of volatile organic chemicals (VOCs), more preferably essentially free of VOCs, even more preferably essentially completely free of VOCs, and most preferably completely free of VOCs. As a particular example of the support substrate may be used the PET film commercially available from Dahua Company, Hanzhou or the releasable paper commercially available from Pengwei Company, Shanghai.

Transparent Overcoat

In the multilayered laminate as disclosed herein, the transparent overcoat is applied on the releasable major surface of the support substrate, and is formed of a first coating composition comprising an aqueous latex having a particle size in the range of 30 to 400 nm. According to the present disclosure, the transparent overcoat, having been released from the support substrate, achieves a gloss of at least 85%, preferably 90% or even more at 60°.

As used herein, the term "an aqueous latex" refers to a stable suspension of polymeric particles in an aqueous liquid medium with the aid of, if necessary, an emulsifier or a dispersion stabilizer. Unless expressly indicated otherwise, the terms "aqueous latex" and "aqueous dispersion", as used herein in the context of a polymer, can be interchangeably used. The aqueous dispersion or latex of polymer may be produced, for example, through an emulsion polymerization process. Suitable emulsion polymerization processes are well known to a person skilled in the art, and generally comprise the steps of dispersing and emulsifying polymerizable monomers into water with the aid of, as appropriate, an emulsifier or a dispersion stabilizer under agitation; and initiating polymerization of the monomers, e.g., by adding an initiator. According to the present disclosure, the polymeric particles can be modified by, for example, incorporating therein some organic functionalities including, but not limited thereto, one or more carboxyl, hydroxyl, amino, isocyanate, sulphonic groups or the like, whereby the aqueous latex can be obtained with desirable properties such as dispersibility. Therefore, the term "aqueous latex" or "aqueous dispersion" as used herein encompasses a dispersion or latex of unmodified polymeric particles in an aqueous medium and also a dispersion or latex of organo-functional modified polymeric particles in an aqueous medium.

The size of the polymeric particles of the aqueous dispersion or latex may be measured in terms of the z-average particle size which is well known in the art. The z-average particle size can be determined according to the dynamic light scattering method by using, for example, a Malvern ZETASIZER™ 3000HS microscopic particle-size analyzer from Malvern Instruments, Ltd. The polymeric particles of the aqueous latex used for the first coating composition as disclosed herein have a z-average particle size of at most 400 nm, preferably less than 300 nm, more preferably less than 200 nm, and even more preferably less than 150 nm. However, the z-average particle size of the polymeric particles is preferably at least 30 nm, more preferably at least 50 nm or more, and even more preferably at least 100 nm or more. In a preferred embodiment, the particle size of the polymeric particles is in the range of 30 to 400 nm, more preferably 100 to 150 nm. A transparent overcoat can be formed from the aqueous dispersion or latex having a suitable particle size falling within the range specified above.

The aqueous dispersion or latex suitably used herein may comprise any of a variety of aqueous dispersions of, for example, organic silicones, styrene-acrylates, acrylates, organic silicone-modified acrylates, vinyl acetate, vinyl acetate-acrylates, vinyl acetate-ethylene, ethylene-vinyl acetate, vinyl acetate-acrylate-esters of versatic acid (e.g., that available under the trademark VEOVA™ 10 from Momentive) or any combination thereof. For the transparent overcoat, aqueous dispersions or latexes that have excellent water resistance and weatherability are preferably used as the film forming resin.

As described above, the aqueous dispersion or latex used for the first coating composition may be prepared by any suitable emulsion polymerization processes which are well known to a person skilled in the art. Alternatively, as a particular example of the aqueous latex, a variety of suitable commercially available products can be used, such as aqueous lattices of styrene-acrylates available from BATF Industry Co., Ltd. under the trademarks RS 998A, RS 968 or RS 936W.

As will be readily appreciated by a person skilled in the art, the first coating composition comprises the aqueous latex in a film-forming amount. Preferably, the amount of the aqueous latex comprised by the first coating composition is about 75 to 99.5% by weight relative to the total weight of the first coating composition. More preferably, the amount of the aqueous latex comprised by the first coating composition is at least about 80%, yet more preferably at least about 85%, and even more preferably about 90% by weight relative to the total weight of the first coating composition. Preferably, the amount of the aqueous latex comprised by the first coating composition is up to about 99%, more preferably about 98%, and even more preferably about 95% by weight relative to the total weight of the first coating composition. If additional water is added in formulating the first coating composition, then the amount of additional water together with the water previously present in the aqueous latex may be taken into account when determining the total weight of the aqueous latex.

If desired, the first coating composition may optionally include additional additives that do not adversely affect the coating composition or a resultant coating obtained therefrom. Suitable additives include, for example, those that improve the processability or manufacturability of the composition, enhance composition aesthetics, or improve a particular functional property or characteristic of the coating composition or the cured composition resulting therefrom, such as adhesion to a substrate. Additives that may be included are, for example, carriers, emulsifiers, pigments, fillers, anti-migration aids, anti-microbials, extenders, curing agents, lubricants, coalescent agents, wetting agents, biocides, plasticizers, crosslinking agents, antifoaming agents, colorants, waxes, anti-oxidants, anticorrosion agents, flow control agents, thixotropic agents, dispersants, adhesion promoters, UV stabilizers, scavenger agents, a thickener, a defoamer, a pH adjuster, an organic solvent, or combinations thereof. Each optional ingredient can be included in a sufficient amount to serve its intended purpose, but preferably not in such an amount to adversely affect a coating composition or a cured coating resulting therefrom. In a preferred embodiment, the first coating composition may comprise a thickener, a dispersing agent, a defoamer, a pH adjuster, an organic solvent, a coalescent agent, a bactericide, a fungicide, or any combination thereof.

The total amount of additives used may be about 0.1 to 25%, preferably about 0.5 to about 20% by weight relative to the total weight of the first coating composition. Preferably, the total amount of additives used may be at least about 0.5%, more preferably at least about 1.0%, even more preferably at least about 2.0%, and most preferably at least about 2.5% by weight relative to the total weight of the first coating composition. Preferably, the total amount of additives used may be at most about 18%, more preferably at most about 15%, even more preferably at most about 10%, and most preferably at most about 8.0% by weight relative to the total weight of the first coating composition.

In an embodiment, the first coating composition may comprise, based on the total weight of the first coating composition, 75 to 99.9% by weight of the aqueous polymer dispersion; and 0.1 to 25% by weight of additional additives comprising a thickener, a dispersing agent, a defoamer, a pH adjuster, an organic solvent, a coalescent agent, a bactericide, a fungicide, or any combination thereof.

In a specific embodiment, the first coating composition may comprise, based on the total weight of the first coating composition, 75 to 99.9% by weight of the aqueous styrene-acrylates polymer dispersion; and 0.1 to 25% by weight of additional additives comprising a thickener, a dispersing agent, a wetting agent, a defoamer, a pH adjuster, an organic solvent, a coalescent agent, a bactericide, a fungicide, or any combination thereof.

In another specific embodiment, the first coating composition may comprise, based on the total weight of the first coating composition, 85 to 95% by weight of the aqueous styrene-acrylates polymer dispersion, 1.5 to 6.5% by weight of the thickener, 0.2 to 0.6% by weight of the dispersing agent, 0.2 to 0.6% by weight of the defoamer, 0.1 to 0.3% by weight of the pH adjuster, 1.5 to 4.5% by weight of the coalescent agent, 1.5 to 4.5% by weight of an organic solvent such as an alcohol, 0.1 to 0.3% by weight of the bactericide, and 0.1 to 0.5% by weight of the fungicide.

To form the transparent overcoat in the multilayered laminate as disclosed herein, the first coating composition may be applied in a certain wet-film thickness which may suitably vary over a broad range and may be readily determined by a person skilled in the art. For example, the wet-film thickness of the transparent overcoat formed from the first coating composition may be about 30 to 150 µm.

Stone-Like Topcoat System

In the multilayered laminate as disclosed herein, the stone-like topcoat system is applied on the transparent overcoat, and the stone-like topcoat system comprises a multicolored spot layer and a background color layer. The term, "a stone-like topcoat system", as used herein means a coating system that is capable of imparting to a target substrate a color or texture like that of a naturally occurring stone such as marble in a visual sense. In the stone-like topcoat system as disclosed herein, the background color layer shows a certain color in a continuous form, thus providing the background color, while the multicolored spot layer provides such a color effect that colored spots or mottles are shown in a discontinuous form of dots, islands, clouds, floc or the like in contrast to the background color. The stone-like topcoat system preferably does not depict text, bar codes or other information. The stone-like topcoat system comprising such a combination of a multicolored spot layer and a background color layer can provide a target substrate with a vivid stone-like effect.

Multicolored Spot Layer

According to the present disclosure, the multicolored spot layer preferably is formed from a third coating composition comprising color concentrate particles protected by a hydrophilic clay colloid and having one or more hues.

The term "color concentrate particles protected by a hydrophilic clay colloid" as used herein, means a color concentrate that achieves the color effect of the multicolored spot layer and includes a form of particles. The surface of such a color concentrate particle is covered by a hydrophilic clay colloid, and can be stably dispersed instead of dissolved in the third coating composition. In the third coating composition according to the present disclosure, color concentrate particles having one hue or a mixture of color concentrate particles with two or more different hues may be employed as desired. In particular, color concentrate particles having a white, black, gray, red, yellow, blue, or green hue, or combination thereof may be included. In one embodiment, the amount of the color concentrate particles protected by a hydrophilic clay colloid in the third coating composition is in a range from about 14.5 to about 45 wt %, preferably from about 20 to about 30 wt %, based on the total weight of the third coating composition.

The color concentrate particles protected by a hydrophilic clay colloid suitably used in the present disclosure can be prepared by a variety of processes for mixing and granulating that will be familiar to a person skilled in the art. In particular, the process for the preparation of the color concentrate particles may comprise the steps of fully mixing a protective hydrophilic clay with deionized water to form a hydrophilic clay colloid, adding to the hydrophilic clay colloid a colored latex paint and mixing the mixture until homogeneous, allowing the thus-formed mixture to pass through a perforated plate selected according to the particle size as desired, thereby forming the color concentrate particles protected by a hydrophilic clay colloid with the desired particle size, in which the protective hydrophilic clay, deionized water and the colored latex paint are present in a mass ratio of 1:5-15:5-15.

The protective hydrophilic clays particularly useful in the preparation of said color concentrate particles can be swelled instead of completely dissolved by water, so as to form a colloid. The term "protective hydrophilic clay" as used herein refers to those hydrous silicate minerals that are characterized by the tendency to swell by absorbing water between adjacent crystal layers, and to split into charged fragments capable of forming colloidal sols. These clays may for example comprise montmorillonites, montmorillonoids, or smectites.

In an embodiment, the hydrophilic clay comprises a synthetic smectite, such as a hydrous sodium lithium magnesium silicate having a layered structure mainly comprising $SiO_2$, $MgO$, $Li_2O$, and $Na_2O$. The crystal structure units of the clay are platelets with a thickness in nanometers, and can form a stable colloid when mixing with and absorbing water. As an example of such a hydrous sodium lithium magnesium silicate having a layered structure, LAPONITE™ RD available from Rockwood Specialties, Inc. may be used. In another embodiment, the organically modified clays are used to reduce the re-aggregation of clays in the colloid. Preferably, an organically modified bentonite is used, for example, GTS™ available from Wangge Company, Shanghai.

Colored latex paints useful for the preparation of the color concentrate particles provide the color concentrate particles with a desired color. The colored latex paint is wrapped or enveloped by the colloid formed from the protective hydrophilic clay, thereby forming color concentrate particles that can be stably dispersed. In an embodiment, the colored latex paint comprises a base latex paint, a colorant, and optionally hydrophilic clay. Preferably, the colored latex paint comprises, relative to the total weight of the colored latex paint, 90 to 99% by weight of a base latex paint, 0.4 to 5% by weight of hydrophilic clay; and 0.01 to 8% by weight of a colorant for the multicolored spot layer.

As the base latex paint, any suitable latex paint known to a person skilled in the art may be used. As an example of the base latex paint, a number of commercially available paints from suppliers including Valspar Corporation, Benjamin Moore & Co., Sherwin-Williams Co., Behr Process Corp., Akzo Nobel, E.I. DuPont de Nemours & Co., PPG Industries, Nippon Paint Co. Ltd., Choaku Marine Paints, Guangdong Carpoly Chemical Industry Co. Ltd., Guangzhou Pearl River Chemical Industry Group Ltd., Hempel-Hai Hong (China) Ltd., Huarun Paints Holdings Co. Ltd., and Kansai Paint Co., Ltd. may be used.

In an embodiment, the base latex paint may be prepared from an aqueous latex and additional additives by any suitable process known to a person skilled in the art. The aqueous latex used therein may be the same or similar as, or may be different from, the aqueous latex for the first coating composition as described above. The aqueous latex may comprise any of a variety of aqueous dispersions, for example organic silicones, styrene-acrylates, acrylates, organic silicone-modified acrylates, vinyl acetate, vinyl acetate-acrylates, vinyl acetate-ethylene, ethylene-vinyl acetate, vinyl acetate-acrylate-esters of versatic acid (e.g., the above-mentioned VEOVA 10 product), or any combination thereof. In an embodiment, the base latex paint comprises, relative to the total weight of the base latex paint, 60 to 95% by weight of the aqueous latex. Preferably, the amount of the aqueous latex in the base latex paint is at least about 65% by weight, more preferably at least about 70% by weight, even more preferably at least about 75% by weight relative to the total weight of the base latex paint. Preferably, the amount of the aqueous latex in the base latex paint is at most about 95% by weight, more preferably at most about 92% by weight, even more preferably at most about 90% by weight relative to the total weight of the base latex paint. Also, if additional water is added in formulating the base latex paint, then the amount of the additional water together with the water previously present in the aqueous latex may be taken into account when determining the total weight of the base latex paint. Optionally, additional additives are added to the aqueous latex to provide desired properties. The effects of the additional additives in the latex paint will be familiar to a person skilled in the art. In an embodiment, the base latex paint comprises, as the additional additives, a filler, a thickener, a dispersing aid, a defoamer, a pH adjuster, an organic solvent (such as an alcohol), a coalescent agent, a bactericide, a fungicide, or any combination thereof. The suitable amount of each of the additives can be readily determined by a person skilled in the art. Preferably, the total amount of additives used may be about 5 to 40% by weight relative to the total weight of the base latex paint.

As usual in the field of latex paint, a pigment or dye may be used to color the base latex paint, so as to form the colored latex paint. The pigment or dye is often incorporated in the form of color concentrate (also referred to as "colorant"). The term "color concentrate" or "colorant" as used herein means the color concentrate obtained by adding one or more pigments or dyes into a vehicle or medium. In an embodiment of the invention, the colorant is water-based, and preferably has a low level of VOCs. The colorant may comprise one or more pigments or dyes, and more preferably one or more pigments.

The compositions of 10 kinds of color concentrate (colorant) commonly used are given in the table below.

| Color concentrate (Colorant) | | |
| --- | --- | --- |
| Hue of Colorant | Pigment | Pigment Wt. % |
| White | PW6 | 53.1 |
| Black | PBK7 | 9.8 |
| Green | PG7 | 20.5 |
| Blue | PB15:2 | 13.1 |
| Red | PR254 | 18 |
| Magenta | PR122 | 11.9 |
| Yellow | PY74 | 16.5 |

-continued

| Color concentrate (Colorant) | | |
|---|---|---|
| Hue of Colorant | Pigment | Pigment Wt. % |
| Medium Yellow | PY74 + PY65 | 36.1 |
| Yellow Oxide | PY42 | 57.9 |
| Red Oxide | PR101 | 59.8 |

As a specific example of the color concentrate, any suitable product commercially available can be used, such as the color concentrates available under the 1900, 8000 and 8800 Series from Color Corporation of America.

In the colored latex paint according to the present disclosure, the kind and amount of the color concentrate used may be adjusted according to the desired hue and color. In an embodiment, the amount of the color concentrate used in the colored latex paint is in the range of from 0.01 to 10% by weight relative to the total weight of the colored latex paint.

Additionally, if desired, the hydrophilic clay may be optionally added to the base latex paint. In an embodiment, the amount of the hydrophilic clay used in the colored latex paint is in the range of from 0.5 to 4% by weight relative to the total weight of the colored latex paint.

According to the present disclosure, the colored latex paint may be prepared by a variety of processes that will be familiar to a person skilled in the art. For example, the colored latex paint may be prepared by charging the base latex paint, the colorant for the multicolored spot layer and optionally, the hydrophilic clay into a vessel, and mixing the mixture well until homogeneous.

In addition to the color concentrate particles, the third coating composition further comprises an aqueous latex. The aqueous latex used therein may be the same or similar as, or may be different from, the aqueous latex for the first coating composition as described above. Preferably, the aqueous latex for the third coating composition is the same or similar as the aqueous latex for the first coating composition, in order to obtain good adhesion between the coating layers.

In an embodiment, the aqueous latex for the third coating composition comprises any of a variety of aqueous dispersions of organic silicones, styrene-acrylates, acrylates, organic silicone-modified acrylates, vinyl acetate, vinyl acetate-acrylates, vinyl acetate-ethylene, ethylene-vinyl acetate, vinyl acetate-acrylate-esters of versatic acid (e.g., the above-mentioned VEOVA 10 product), or any combination thereof.

As stated above for the transparent overcoat, the aqueous latex for the third coating composition may be produced through a variety of suitable emulsion polymerization processes that will be familiar to a person skilled in the art. Alternatively, as a specific example of the aqueous latex, any of the suitable products commercially available may be used, such as an aqueous latex of acrylates e.g., 2709 from BATF Industry Co., Ltd.

As will be readily appreciated by a person skilled in the art, the third coating composition comprises the aqueous latex in a film-forming amount. Preferably, the amount of the aqueous latex used in the third coating composition is about 45 to 85%, preferably about 50 to 65% by weight relative to the total weight of the third coating composition. Also, if additional water is added in formulating the third coating composition, then the amount of additional water together with the water previously present in the aqueous latex may be taken into account when determining the total amount of the aqueous latex.

The third coating composition may optionally include additional additives for similar reasons as in the first coating composition. In a preferred embodiment, the third coating composition may comprise a thickener, a dispersing agent, a defoamer, a pH adjuster, an organic solvent such as an alcohol, a coalescent agent, a bactericide, a fungicide, or any combination thereof. Suitable amounts of each of the additives can be readily determined by a person skilled in the art. Preferably, the total amount of additives used may be about 0.1 to 10%, preferably about 4.5 to about 10% by weight relative to the total weight of the third coating composition.

In an embodiment, the third coating composition may comprise, based on the total weight of the third coating composition, 45 to 85% by weight of the aqueous polymer dispersion; 14.5 to 45% by weight of the color concentrate particles protected by hydrophilic clay colloid; and 0.1 to 10% by weight of additional additives comprising a thickener, a dispersing agent, a defoamer, a pH adjuster, an organic solvent, a coalescent agent, a bactericide, a fungicide, or any combination thereof.

In a specific embodiment, the third coating composition may comprise, based on the total weight of the third coating composition, 45 to 85% by weight of the aqueous dispersion of acrylates; 14.5 to 45% by weight of the color concentrate particles protected by a hydrophilic clay colloid; and 0.1 to 10% by weight of additional additives comprising a thickener, a dispersing agent, a defoamer, a pH adjuster, an organic solvent, a coalescent agent, a bactericide, a fungicide, or any combination thereof.

In another specific embodiment, the third coating composition may comprise, based on the total weight of the third coating composition, 50 to 65% by weight of the aqueous dispersion of acrylates; 20 to 30% by weight of the color concentrate particles protected by a hydrophilic clay colloid; 0.8 to 3% by weight of the thickener, 0.2 to 1% by weight of the dispersing agent, 0.2 to 0.6% by weight of the defoamer, 0.1 to 0.3% by weight of the pH adjuster, 2 to 3% by weight of the coalescent agent, 1 to 2% by weight of the organic solvent such as an alcohol, 0.1 to 0.3% by weight of the bactericide, and 0.1 to 0.5% by weight of the fungicide.

In order to form the multicolored spot layer of the stone-like topcoat system, the third coating composition is applied at an adequate wet film thickness, which can vary in a wide range and can be readily selected by a person skilled in the art. For example, the wet film thickness of the multicolored spot layer formed of the third coating composition may range from about 30 to about 150 µm.

Background Color Layer

According to the present disclosure, the background color layer is formed from a fourth coating composition comprising mineral powders in the form of discrete particles.

As used herein, the term "mineral powders in the form of discrete particles" means the powders of naturally occurring or synthetic stones or minerals having a desired particle size, which can be produced by using any conventional process, such as comminuting, grinding, or the like. As an example of such mineral powders, any commercially available powders of naturally occurring stone such as marble, quartzite, dolomite and so on, for example marble powders from Yunfu, Guangdong, China, or any suitable filler in the form of powders which are commonly used in coating compositions, such as powders of rutile titanium dioxide, heavy calcium carbonate, calcined kaolin, or the like can be used. According to the present disclosure, the mineral powders in the form of discrete particles are present in an amount of about 10 to about 85% by weight related to the total weight of the fourth coating composition.

In an embodiment, the powders of naturally occurring stone, such as marble, are used as the mineral powders in the form of discrete particles in an amount of about 60 to 75% by weight relative to the total weight of the fourth coating composition. Incorporation of a relatively large amount of naturally occurring stone powders in the fourth coating composition as pigment enables the fourth coating composition to achieve a vivid stone-like effect, and as well significantly reducing the cost of the product. As an example of naturally occurring stone powders, the marble powders available from Yunfu, Guangdong can be used.

In another embodiment, a conventional powder filler is used as the mineral powder in the form of discrete particles in an amount of about 35 to 70 by % by weight relative to the total weight of the fourth coating composition. In view of the fact that the conventional powder fillers tend to result in a lower strength as compared with the naturally occurring stone powders, preferably an adequate amount of silane coupling agent is incorporated into the fourth coating composition comprising such conventional powder fillers as an additional additive in order to improve the strength of the coating. Exemplary conventional powder fillers include the rutile titanium dioxide powder available from E. I. du Pont de Nemours and Company under the trademark TYZOR™ R-706, the heavy calcium carbonate powder available from Jiaoling Guangfu under the trademark Gf-117™, the calcined kaolin powder available from Jinyang Shanxi under the trademark Br-95™, or any combination thereof.

Furthermore, in order to impart a desired color to the background color layer, optionally a color concentrate or colorant may be incorporated in the fourth coating composition. The colorant used herein may have the same or similar composition as that of the colorant mentioned with respect to the aforesaid colored latex paint, which is also obtainable by loading a pigment or dye known in the art in a suitable vehicle or medium. Depending on the practical demand, the colorant used in the background color layer may have the same or different color, preferably the different color, as compared with the colorant used in the multicolored spot layer. In an embodiment, the colorant is present in the fourth coating composition in an amount of 0.01 to 10% by weight relative to the total weight of the fourth coating composition. As a specific example of the colorant, any suitable commercially available product can be used, such as colorant numbers 8800N, 8813N, 8814N and 8821N from Color Corporation of America.

The fourth coating composition according to the present disclosure further comprises an aqueous latex. The aqueous latex used therein may be the same or similar as, or may be different from, the aqueous latex for the first coating composition as described above. In an embodiment of the invention, the aqueous latex for the fourth coating composition comprises any of a variety of aqueous dispersions of organic silicones, styrene-acrylates, acrylates, organic silicone-modified acrylates, vinyl acetate, vinyl acetate-acrylates, vinyl acetate-ethylene, ethylene-vinyl acetate, vinyl acetate-acrylate-esters of versatic acid (e.g., the above-mentioned VEOVA 10 product), or any combination thereof.

As stated above for the transparent overcoat, the aqueous latex for the fourth coating composition may be produced through a variety of emulsion polymerization processes that will be familiar to a person skilled in the art. Alternatively, as a specific example of the aqueous latex, any of a number of suitable commercially available products may be used, such as an aqueous latex of acrylates e.g., 706T from BATF Industry Co., Ltd., or an aqueous latex of vinyl acetate-ethylene e.g., CELVOLIT™ 1602 from Celanese Corporation, USA.

As will be readily appreciated by a person skilled in the art, the fourth coating composition comprises the aqueous latex in a film-forming amount. Preferably, the amount of the aqueous latex used in the fourth coating composition may be suitably selected as desired. According to the present disclosure, the amount of the aqueous latex used in the fourth coating composition is in a range of from about 14.5 to 80% by weight relative to the total weight of the fourth coating composition. In an embodiment of the invention, the amount of the aqueous latex used in the fourth coating composition is in a range of from about 14.5 to 40%, preferably from about 22 to 35% by weight relative to the total weight of the fourth coating composition. In another embodiment of the invention, the amount of the aqueous latex used in the fourth coating composition is in a range of from about 40 to 80%, preferably from about 50 to 70% by weight relative to the total weight of the fourth coating composition. Also, if additional water is added in formulating the fourth coating composition, then the amount of additional water together with the water previously present in the aqueous latex may be taken into account when determining the total amount of the aqueous latex.

The fourth coating composition may optionally include additional additives for reasons like those for the first coating composition. In a preferred embodiment, the fourth coating composition may comprise a thickener, a dispersing agent, a defoamer, a pH adjuster, an organic solvent such as an alcohol, a coalescent agent, a bactericide, a fungicide, or any combination thereof. The suitable amount of each of the additives can be readily determined by a person skilled in the art. Preferably, the total amount of additives used may be about 0.1 to 10%, preferably about 4.5 to about 10% by weight relative to the total weight of the fourth coating composition.

According to the present disclosure, the fourth coating composition, based on the total weight of the fourth coating composition, comprises 14.5 to 80% by weight of the aqueous polymer dispersion; 10 to 85% by weight of the mineral powders in the form of discrete particles; 0 to 10% by weight of the colorant for the background color layer; and 0.1 to 10% by weight of additional additives comprising a thickener, a dispersing agent, a defoamer, a pH adjuster, an organic solvent, a coalescent agent, an optional silane coupling agent, a bactericide, a fungicide, or any combination thereof.

According to an embodiment of the invention, the fourth coating composition, based on the total weight of the fourth coating composition, comprises 14.5 to 40% by weight of the aqueous polymer dispersion; 50 to 85% by weight of the mineral powders in the form of discrete particles; and 0.1 to 10% by weight of additional additives comprising a thickener, a dispersing agent, a defoamer, a pH adjuster, an organic solvent, a coalescent agent, a bactericide, a fungicide, or any combination thereof.

According to a specific embodiment of the invention, the fourth coating composition, based on the total weight of the fourth coating composition, comprises 14.5 to 40% by weight of an aqueous dispersion of acrylates; 50 to 85% by weight of naturally occurring stone powders in the form of discrete particles; and 0.1 to 10% by weight of additional additives comprising a thickener, a dispersing agent, a defoamer, a pH adjuster, an organic solvent, a coalescent agent, a bactericide, a fungicide, or any combination thereof.

According to another specific embodiment of the invention, the fourth coating composition, based on the total weight of the fourth coating composition, comprises 22 to 35% by weight of the aqueous dispersion of acrylates; 60 to 75% by weight of the naturally occurring stone powders in the form of discrete particles; 0.8 to 3% by weight of the thickener; 0.2 to 1% by weight of the dispersing agent; 0.2 to 0.6% by weight of the defoamer; 0.1 to 0.3% by weight of the pH adjuster; 2 to 3% by weight of the coalescent; 1 to 2% by weight of the organic solvent; 0.1 to 0.3% by weight of the bactericide; and 0.1 to 0.5% by weight of the fungicide.

According to another embodiment, the fourth coating composition, based on the total weight of the fourth coating composition, comprises 14.5 to 80% by weight of the aqueous polymer dispersion; 10 to 85% by weight of the mineral powders in the form of discrete particles; 0.01 to 10% by weight of the colorant for the background color layer; and 0.1 to 10% by weight of additional additives comprising a thickener, a dispersing agent, a defoamer, a pH adjuster, an organic solvent, a coalescent agent, a silane coupling agent, a bactericide, a fungicide, or any combination thereof.

According to another embodiment, the fourth coating composition, based on the total weight of the fourth coating composition, comprises 14.5 to 80% by weight of the aqueous dispersion of vinyl acetate-ethylene copolymer; 10 to 70% by weight of the conventional filler in the form of discrete particles; 0.01 to 10% by weight of the colorant for the background color layer; and 0.1 to 10% by weight of additional additives comprising a thickener, a dispersing agent, a defoamer, a pH adjuster, an organic solvent, a coalescent agent, a silane coupling agent, a bactericide, a fungicide, or any combination thereof.

According to a particularly specific embodiment, the fourth coating composition, based on the total weight of the fourth coating composition, comprises 50 to 70% by weight of the aqueous dispersion of vinyl acetate-ethylene copolymer; 35 to 70% by weight of the filler; 0.1 to 2% by weight of the colorant for the background color layer; 0.5 to 2.5% by weight of the silane coupling agent; 0.4 to 1% by weight of the thickener; 0.2 to 0.6% by weight of the dispersing agent; 0.2 to 0.6% by weight of the defoamer; 0.1 to 0.3% by weight of the pH adjuster; 0 to 1% by weight of the coalescent; 0 to 1% by weight of the organic solvent; 0.1 to 0.3% by weight of the bactericide; and 0.1 to 0.3% by weight of the fungicide.

In order to form the background color layer of the stone-like topcoat system, the fourth coating composition is applied at an adequate wet film thickness, which can vary in a wide range and can be readily selected by a person skilled in the art. For example, the wet film thickness of the background color layer formed of the fourth coating composition may range from about 30 to about 120 μm.

Adhesive Primer Coat

In the multilayered laminate as disclosed herein, the adhesive primer coat is applied on the stone-like topcoat system and is formed of a second coating composition comprising an aqueous polymer dispersion selected from the aqueous dispersions of acrylics, organic silicones, and vinyl acetates. The adhesive primer coat in the multilayered laminate preferably has an adhesive strength of 0.7 MPa or more as measured by adhesive strength measurement method of GB/T 9779-2005.

In the adhesive primer coat, the aqueous polymer dispersion serves as a binder to provide adhesion to a target substrate such as an architectural material. The aqueous polymer dispersion may be selected from aqueous dispersions of acrylics, organic silicones, vinyl acetates or the like or other suitable aqueous dispersions having adequate adhesion to the chosen substrate. Preferably, an aqueous dispersion of vinyl acetate-ethylene copolymer can be used. That is, the adhesive primer coat comprises the aqueous dispersion of vinyl acetate-ethylene copolymer as a binder to provide adhesion to a target substrate such as an architectural material. As described above, the aqueous dispersion of vinyl acetate-ethylene copolymer used may be a dispersion of vinyl acetate-ethylene copolymer particles in an aqueous medium with aid of, if necessary, an emulsifier or a dispersion stabilizer. Additional co-monomers can be also used, if appropriate, in preparing the aqueous dispersion of vinyl acetate-ethylene copolymer.

Preferably, the amount of the aqueous polymer dispersion comprised by the second coating composition is about 40 to 85%, preferably about 60 to 80% by weight relative to the total amount of the second coating composition. Also, if additional water is added in formulating the second coating composition, then the amount of additional water together with the water previously present in the aqueous polymer dispersion may be taken into account when determining the total amount of the aqueous polymer dispersion.

As described above, the aqueous dispersion of vinyl acetate-ethylene copolymer used for the second coating composition may be prepared by any suitable emulsion polymerization process known to a person skilled in the art. Alternatively, as a particular example of the aqueous polymer dispersion, any of a variety of suitable commercially available products can be used, such as the aqueous dispersion of vinyl acetate-ethylene copolymer available under the trademark VINNAPAS™ 402 from Wacker Chemie AG, Germany or CELVOLIT™ 1602 or 1608 from Celanese Corporation, USA.

The second coating composition may further comprise one or more fillers. As used herein, the term "filler" is intended to refer to any coating volume extender, either organic or inorganic, in the form of e.g., particles or powders. There is no particular limitation on the shape of particles, and thus they may have any suitable shape. The particle size of the filler may vary over a broad range, e.g., from about 10 nanometers to about 50 micrometers. In addition to function as a coating volume extender, some fillers may impart one or more desired properties to the composition or coating resulting from the composition. For example, some fillers may impart desired color to the composition and hence the coating resulting from the composition, and in this case such fillers may be also referred to as "pigment". Some fillers may improve chemical or physical properties, in particular mechanical properties of the coating resulting from the composition, and in this case they may also be referred to as a "reinforcing additive".

Suitable illustrative additional fillers include kaolin, titanium oxide, calcium carbonate, talc, barium sulfate, magnesium aluminum silicate, silica, or any combination thereof. In a preferred embodiment, the additional filler may include titanium oxide, kaolin, calcium carbonate, or any combination thereof. The total amount of filler used may vary over a broad range, for example, from about 10 to about 58, preferably about 33 to about 58% by weight relative to the total weight of the second coating composition.

The second coating composition may further comprise a silane coupling agent to enhance the mechanical strength of the coating. An example of the silane coupling agent is WD60 commercially available from Wuda Organosilicon, Hubei. A suitable amount of the silane coupling agent can be easily determined by a person skilled in the art. Conventionally, the amount of the silane coupling agent may be from about 0.5 to 2.5% by weight relative to the total weight of the second coating composition.

The second coating composition may optionally include additional additives for reasons like those for the first coating composition. In a preferred embodiment, the second coating composition may comprise a thickener, a dispersing agent, a defoamer, a pH adjuster, an organic solvent such as an alcohol, a coalescent agent, a bactericide, a fungicide, or any combination thereof. A suitable amount of each of the additives can be readily determined by a person skilled in the art. Preferably, the total amount of additives used may be about 0.1 to 10%, preferably about 4.5 to about 10% by weight relative to the total weight of the second coating composition.

In an embodiment, the second coating composition may comprise, based on the total weight of the second coating composition, 45 to 85% by weight of the aqueous polymer dispersion; 10 to 58% by weight of the filler; 0.5 to 2.5% by weight of the silane coupling agent; and 0.1 to 10% by weight of additional additives comprising a thickener, a dispersing agent, a defoamer, a pH adjuster, an organic solvent, a coalescent agent, a bactericide, a fungicide, or any combination thereof.

In a specific embodiment, the second coating composition may comprise, based on the total weight of the second coating composition, 45 to 85% by weight of the aqueous dispersion of vinyl acetate-ethylene copolymer; 10 to 58% by weight of the filler; 0.5 to 2.5% by weight of the silane coupling agent; and 0.1 to 10% by weight of additional additives comprising a thickener, a dispersing agent, a defoamer, a pH adjuster, an organic solvent, a coalescent agent, a bactericide, a fungicide, or any combination thereof.

In another specific embodiment, the second coating composition may comprise, based on the total weight of the second coating composition, 60 to 80% by weight of the aqueous dispersion of vinyl acetate-ethylene copolymer, 33 to 58% by weight of the filler, 0.5 to 2.5% by weight of the silane coupling agent, 0.4 to 1% by weight of the thickener, 0.2 to 0.6% by weight of the dispersing agent, 0.2 to 0.6% by weight of the defoamer, 0.1 to 0.3% by weight of the pH adjuster, 0 to 1% by weight of the coalescent, 0 to 1% by weight of the organic solvent, 0.1 to 0.3% by weight of the bactericide, and 0.1 to 0.3% by weight of the fungicide.

Each of the coating compositions as disclosed herein can be prepared by any suitable compounding process known to a person skilled in the art. For example, the coating compositions can be prepared by feeding all the ingredients into a vessel, then agitating the mixture until homogeneous. Alternatively, the coating compositions can be prepared by feeding and mixing a part of the ingredients, then feeding the other ingredients and agitating until homogeneous.

In a second aspect, the present disclosure provides a process for the preparation of multilayered laminate, comprising
(i) providing a support substrate having at least one releasable major surface;
(ii) applying a first coating composition on the releasable major surface of the support substrate to form a transparent overcoat, wherein the first coating composition comprises an aqueous polymer dispersion having a particle size in the range of 30 to 400 nm;
(iii) by wet on dry application process, forming a multi-colored spot layer and a background color layer in turn on the transparent overcoat, thereby forming a stone-like topcoat system;
(iv) by wet on dry application process, applying a second coating composition on the stone-like topcoat system to form an adhesive primer coat, wherein the second coating composition comprises an aqueous polymer dispersion selected from aqueous dispersions of acrylics, organic silicones, and vinyl acetates, thereby obtaining the multilayered laminate,
wherein the transparent overcoat in the multilayered laminate, when released from the support substrate, has a gloss of at least 60% at 60°.

In the process as disclosed herein, each of the coating compositions can be applied by any conventional application process known to a person skilled in the art. The application process may comprise dip application, spin application, spray application, curtain application, brush application, roller application, or any other suitable application process. In steps (iii) and (iv) above, a wet on dry application process is used. Conveniently, the aqueous liquid medium including water and any co-solvent can be removed by drying in ambient conditions or with (for example, under) heat, whereby the coating or coating system is formed.

In a third aspect, the present disclosure provides a process for coating a target substrate, comprising
(i) attaching a multilayered laminate according to the present invention via the adhesive primer coat to the surface of the target substrate;
(ii) releasing the support substrate from the multilayered laminate, thereby obtaining a coated substrate having a stone-like effect and a gloss of at least 60% at 60°.

In an embodiment, the target substrate comprises architectural materials or wood-based substrates. In particular, the architectural materials may comprise concrete mass, plaster board, lime-sand brick, aerated concrete, lightweight multilayer plate, fiber cement board or any combination thereof. The wood-based substrates may comprise a natural wood substrate, synthetic or engineered wood-based substrate, or any combination thereof.

According to the process for coating a target substrate as disclosed herein, the multilayered laminate can be attached to the target substrate by any suitable method. In an embodiment, the multilayered laminate is attached to the target substrate by mechanically laminating. The multilayered laminate, which may be in the form of a coil, can be laminated to the target substrate by an in-line laminating process. In order to promote adhesion of the multilayered laminate to the target substrate, one can take any suitable measure known in the art to treat the surface of the target substrate, such as cleaning, sanding, or the like. In order to further promote adhesion of the multilayered laminate to the target substrate, one can also apply any chemical adhesive known in the art to adhere the multilayered laminate to the target substrate. In a specific embodiment, the adhesive primer coat of the multilayered laminate itself can provide the sufficient adhesive strength to securely adhere the multilayered laminate to the target substrate. In order to protect the adhesive primer coat from being contaminated, a protective film can be applied on the primer coat. The strength of adhesion of the protective film to the primer coat preferably is such that the premature release of the protective film from the primer coat during transportation and storage can be prevented, but not render the release strength of the protective film from the primer coat too high.

The present disclosure is further described in the following examples that are intended as illustrations only. Unless otherwise noted, all parts, percentages, and ratios reported in the following examples are on a weight basis.

EXAMPLES

Measurement Method

The adhesive strength is measured according to GB/T 9779-2005.

The gloss is measured according to GB/T 1743-1989.

Example 1

Transparent Overcoat

The ingredients and amounts thereof used for formulating the first coating composition to form the transparent overcoat are shown in Table 1 below.

TABLE 1

| Ingredients | Supplier/Manufacturer | Description | Amount (in parts) |
|---|---|---|---|
| RS-936W | BATF Industry Co., Ltd. | Aqueous styrene-acrylate latex, particle size 100 to 150 nm | 50-60 |
| Thickener HEC 250HBR | Aqualon Company | Cellulose ether thickener | 2-6 |
| TT-935 | Dow Chemical Co. | Alkali swelling thickener | |
| P30 | Coatex Group | Polyacrylate dispersing agent | 0.2-0.6 |
| L1513 | Aqualon Company | Defoamer | 0.2-0.6 |
| AMP-95 ™ | Dow Chemical Co. | pH adjuster | 0.1-0.3 |
| CMIT/MIT; BIT | Dow Chemical Co. | Bactericide | 0.1-0.3 |
| DCOIT | Dow Chemical Co. | Fungicide | 0.1-0.5 |
| Lauryl alcohol ester | Eastman Chemical Co. | Coalescent agent | 2-4 |
| Propylene glycol | general industrial product | Organic solvent | 2-4 |
| Deionized water | | | 35-40 |

The first coating composition to be used for forming the transparent overcoat was prepared as follows. The ingredients including RS-936W, HEC 250HBR, TT-935, P30, L1513, Amp-95, CMIT/MIT;BIT, DCOIT, lauryl alcohol ester, propylene glycol, and deionized water were fed into a mixing vessel equipped with an agitator in order in amounts as respectively specified in Table 1, and agitated until homogeneous.

Stone-Like Topcoat System

Example 2

Multicolored Spot Layer

The ingredients and amounts thereof used for formulating the third coating composition to form the multicolored spot layer are shown in Table 2 below.

TABLE 2

| Ingredients | Supplier/Manufacturer | Description | Amount (in parts) |
|---|---|---|---|
| 2709 | BATF Industry Co., Ltd. | Aqueous acrylate latex | 35-45 |
| Color concentrate particles | Produced as described below | Color concentrate particles protected by hydrophilic clay colloid | 20-30 |
| Thickener HEC 250HBR | Aqualon Company | Cellulose ether thickener | 0.8-3 |
| TT-935 | Dow Chemical Co. | Alkali swelling thickener | |
| P30 | Coatex Group | Polyacrylate dispersing agent | 0.2-1 |
| L1513 | Aqualon Company | Defoamer | 0.2-0.6 |
| AMP-95 | Dow Chemical Co. | pH adjuster | 0.1-0.3 |
| CMIT/MIT; BIT | Dow Chemical Co. | Bactericide | 0.1-0.3 |
| DCOIT | Dow Chemical Co. | Fungicide | 0.1-0.5 |
| Lauryl alcohol ester | Eastman Chemical Co. | Coalescent agent | 2-3 |
| Propylene glycol | general industrial product | Organic solvent | 1-2 |
| Deionized water | | | 15-20 |

The third coating composition to be used for forming the multicolored spot layer was prepared as follows. The ingredients including the aqueous latex 2709, the color concentrate particles, HEC 250HBR, TT-935, P30, L1513, Amp-95, CMIT/MIT;BIT, DCOIT, lauryl alcohol ester, propylene glycol, and deionized water were fed into a mixing vessel equipped with an agitator in order in amounts as respectively specified in Table 2, and agitated until homogeneous.

Production of Color Concentrate Particles Protected by Hydrophilic Clay Colloid 4 to 8 parts by mass of the protective hydrophilic clay GTS available from Wangge Company, Shanghai were mixed into 45 to 58 parts by mass of deionized water to form a colloid. The ingredients as specified in Table 3 below were mixed in a separate vessel to form the colored latex paint. Then 45 to 58 parts by mass of the colored latex paint were mixed into the thus-formed colloid. The thus-formed mixture was passed through a perforated plate, thereby forming the color concentrate particles protected by hydrophilic clay colloid.

TABLE 3

| Ingredients | Supplier/Manufacturer | Description | Amount (in parts) |
|---|---|---|---|
| 2709 | BATF Industry Co., Ltd. | Aqueous acrylate latex | 18-35 |
| P30 | Coatex Group | Polyacrylate dispersing agent | 0.2-1 |
| Thickener HEC 250HBR | Aqualon Company | Cellulose ether thickener | 0.8-3 |
| Bentonite | Wangge Company | Thickener | |
| 399 | Wangge Company | Dispersing agent | 0.3-1.0 |
| R-706 | E. I. du Pont de Nemours and Co. | Rutile titania | 1-8 |
| Kaolin | Jingyang, Shanxi | filler | 3-10 |
| L1513 | Aqualon Company | Defoamer | 0.2-0.6 |
| AMP-95 | Dow Chemical Co. | pH adjuster | 0.1-0.3 |
| CMIT/MIT; BIT | Dow Chemical Co. | Bactericide | 0.1-0.3 |
| DCOIT | Dow Chemical Co. | Fungicide | 0.1-0.5 |
| Lauryl alcohol ester | Eastman Chemical Co. | Coalescent agent | 2-3 |
| Propylene glycol | general industrial product | Organic solvent | 1-2 |
| Deionized water | | | 15-20 |
| GTS | Wangge Company | Optional hydrophilic clay | 0.7-1.5 |
| Color concentrate | CCA Company | Colorant | As desired |

Example 3

Background Color Layer 1

The ingredients and amounts thereof used for formulating the fourth coating composition to form the background color layer 1 are shown in Table 4 below.

TABLE 4

| Ingredients | Supplier/Manufacturer | Description | Amount (in parts) |
|---|---|---|---|
| 706T | BATF Industry Co., Ltd. | Aqueous acrylate latex | 12-16 |
| Marble powder | Yunfu, Guangdong | Mineral powder as discrete particles | 60-75 |
| Thickener HEC 250HBR | Aqualon Company | Cellulose ether thickener | 0.8-3 |
| TT-935 | Dow Chemical Co. | Alkali swelling thickener | |
| P30 | Coatex Group | Polyacrylate dispersing agent | 0.2-1 |
| L1513 | Aqualon Company | Defoamer | 0.2-0.6 |
| AMP-95 | Dow Chemical Co. | pH adjuster | 0.1-0.3 |
| CMIT/MIT; BIT | Dow Chemical Co. | Bactericide | 0.1-0.3 |
| DCOIT | Dow Chemical Co. | Fungicide | 0.1-0.5 |
| Lauryl alcohol ester | Eastman Chemical Co. | Coalescent agent | 2-3 |
| Propylene glycol | general industrial product | Organic solvent | 1-2 |
| Deionized water | | | 10-15 |

The fourth coating composition to be used for forming the background color layer 1 was prepared as follows. The ingredients including 706T, Marble powder, HEC 250HBR, TT-935, P30, L1513, Amp-95, CMIT/MIT;BIT, DCOIT, Lauryl alcohol ester, Propylene glycol, and Deionized water were fed into an agitated vessel in order in amounts as respectively specified in Table 4, and agitated until homogeneous.

Example 4

Background Color Layer 2

The ingredients and amounts thereof used for formulating the fourth coating composition to form the background color layer 2 are shown in Table 5 below.

TABLE 5

| Ingredients | | Supplier/Manufacturer | Description | Amount (in parts) |
|---|---|---|---|---|
| CELVOLIT 1608 | | Celanese Corporation | VAE latex | 20-30 |
| Thickener | HEC 250HBR | Aqualon Company | Cellulose ether thickener | 0.4-1 |
| | TT-935 | Dow Chemical Co. | Alkali swelling thickener | |
| R-706 | | E. I. du Pont de Nemours and Co. | Rutile titania, mineral powder as discrete particles | 10-30 |
| Gf-117 | | Jiaoling Guangfu | Heavy calcium carbonate, Mineral powder as discrete particles | 15-25 |
| Br-95 | | Jinyang Shanxi | Calcined kaolin, mineral powder as discrete particles | 10-15 |
| WD60 | | Wuda Organosilicon, Hubei | Silane coupling agent | 0.5-2.5 |
| P30 | | Coatex Group | Polyacrylate dispersing agent | 0.2-0.6 |
| L1513 | | Aqualon Company | Defoamer | 0.2-0.6 |
| AMP-95 | | Dow Chemical Co. | pH adjuster | 0.1-0.3 |
| CMIT/MIT; BIT | | Dow Chemical Co. | Bactericide | 0.1-0.3 |
| DCOIT | | Dow Chemical Co. | Fungicide | 0.1-0.5 |
| Lauryl alcohol ester | | Eastman Chemical Co. | Coalescent agent | 0-1 |
| Propylene glycol | | general industrial product | Organic solvent | 0-1 |
| Color concentrate | | CCA Company | Colorant | As desired |
| Deionized water | | | | 30-40 |

The fourth coating composition to be used for forming the background color layer 2 was prepared as follows. The ingredients including CELVOLIT 1608, R-706, Gf-117, Br-95, WD60, HEC 250HBR, TT-935, P30, L1513, Amp-95, CMIT/MIT;BIT, DCOIT, lauryl alcohol ester, propylene glycol, color concentrate, and deionized water were fed into a mixing vessel equipped with an agitator in order in amounts as respectively specified in Table 5, and agitated until homogeneous.

Example 5

Adhesive Primer Coat

The ingredients and amounts thereof used for formulating the second coating composition to form the adhesive primer coat are shown in Table 6 below.

TABLE 6

| Ingredients | | Supplier/Manufacturer | Description | Amount (in parts) |
|---|---|---|---|---|
| CELVOLIT 1608 | | Celanese Corporation | VAE latex | 30-40 |
| HEC 250HBR | | Aqualon Company | Cellulose ether thickener | 0.4-1 |
| TT-935 | | Dow Chemical Co. | Alkali swelling thickener | |
| filler | R-706 | E. I. du Pont de Nemours and Co. | Rutile titania | 10-20 |
| | Gf-117 | Jiaoling Guangfu | Heavy calcium carbonate | 15-25 |
| | Br-95 | Jinyang Shanxi | Calcined kaolin | 8-13 |
| WD60 | | Wuda Organosilicon, Hubei | Silane coupling agent | 0.5-2.5 |
| P30 | | Coatex Group | Polyacrylate dispersing agent | 0.2-0.6 |
| L1513 | | Aqualon Company | Defoamer | 0.2-0.6 |
| AMP-95 | | Dow Chemical Co. | pH adjuster | 0.1-0.3 |
| CMIT/MIT; BIT | | Dow Chemical Co. | Bactericide | 0.1-0.3 |
| DCOIT | | Dow Chemical Co. | Fungicide | 0.1-0.5 |
| Lauryl alcohol ester | | Eastman Chemical Co. | Coalescent agent | 0-1 |
| Propylene glycol | | general industrial product | Alcohols solvent | 0-1 |
| Deionized water | | | | 30-40 |

The second coating composition to be used for forming the adhesive primer coat was prepared as follows. The ingredients including CELVOLIT 1608, R-706, Gf-117, Br-95, WD60, HEC 250HBR, TT-935, P30, L1513, Amp-95, CMIT/MIT;BIT, DCOIT, lauryl alcohol ester, propylene glycol, and deionized water were fed into a mixing vessel equipped with an agitator in order in an amount as respectively specified in Table 6, and agitated until homogeneous.

Example 6

Multilayered Laminate

The first coating composition as prepared in Example 1 was sprayed onto a piece of PET film (about 60 to 120 cm×about 60 to 120 cm) with a wet film thickness in the range of 30 to 150 μm in order to form the transparent overcoat. After drying for 2 hours in ambient conditions to surface dry the transparent overcoat, the third coating composition as prepared in Example 2 was sprayed onto the transparent overcoat with a wet film thickness in the range of 30 to 150 μm in order to form the multicolored spot layer. Then after drying in ambient conditions to surface dry the multicolored spot layer, the fourth coating composition as prepared in Example 3 or 4 was sprayed onto the multicolored spot layer with a wet film thickness in the range of 30 to 120 μm in order to form the background color layer. After drying in ambient conditions to surface dry the background color layer, the second coating composition as prepared in Example 5 was sprayed onto the background color layer with a wet film thickness in the range of 30 to 120 μm in order to form the adhesive primer coat. The multilayered laminate was obtained after drying in ambient conditions for a further 24 hours.

In the thus obtained multilayered laminate, the adhesive primer coat had an adhesive strength of 0.8 MPa as measured by adhesive strength measurement method of GB/T 9779-2005 by using an article formed by mixing silicate cement, sand, and water in a ratio of 1:1:0.5 in weight as a test substrate. Moreover, the transparent overcoat having been released from the PET film substrate, showed a gloss of at least 86% at 60° as measured according to GB/T 1743-1989.

Figure 1:
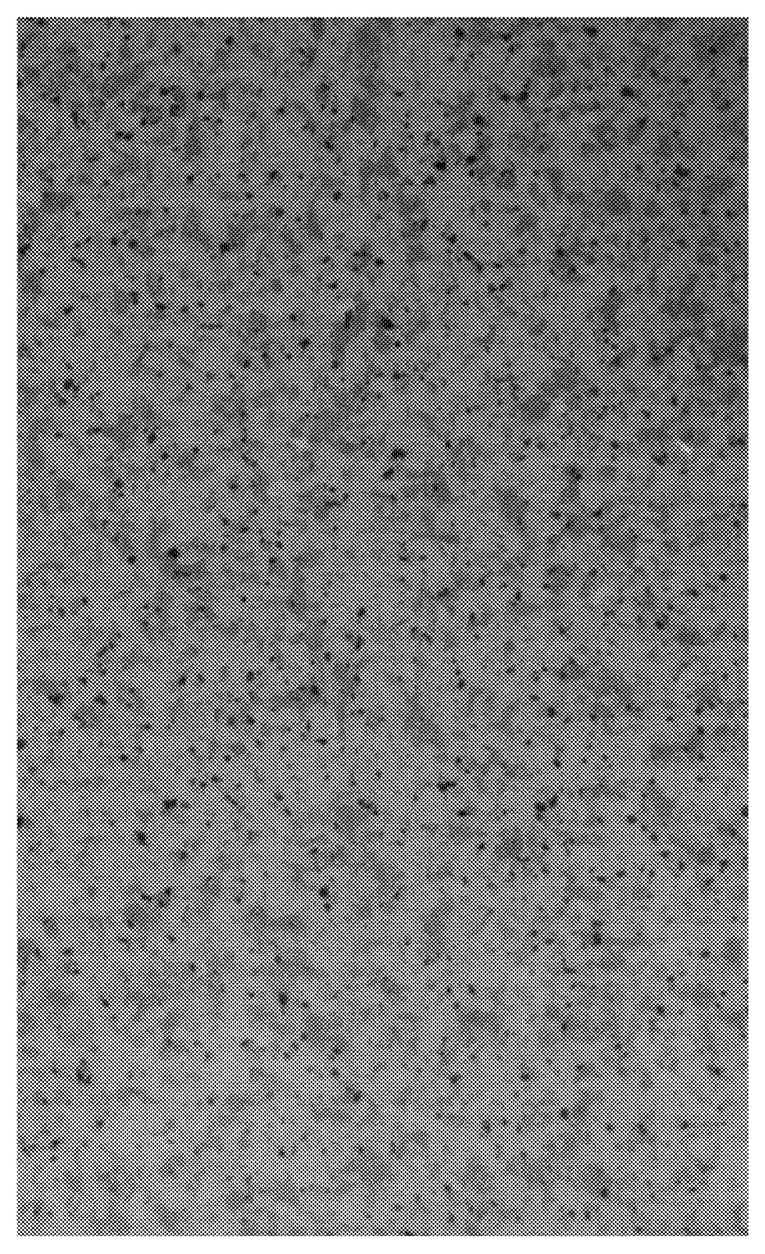
FIG. 1 is a photograph showing the surface of the coating system obtained by adhering a multilayered laminate according to the present disclosure to the surface of a fiber cement board, followed by releasing the support substrate.

Additionally, the multilayered laminate as obtained above with the background color layer 2 was attached to the target substrate made of a fiber cement board, and it was visually observed that the coating system obtained after removing the PET film from the multilayered laminate exhibited a realistic marble-like effect, as shown in FIG. 1.

Thus, the multilayered laminate according to the present disclosure achieved a realistic stone-like effect and also high gloss.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:
1. A multilayered laminate, comprising
  (a) a support substrate having at least one releasable major surface;
  (b) a transparent overcoat formed of a first coating composition on the releasable major surface of the support substrate, wherein the first coating composition comprises an aqueous polymer dispersion having a particle size in the range of 30 to 400 nm, and wherein the first coating composition, based on the total weight of the first coating composition, comprises:
    75 to 99.9% by weight of the aqueous polymer dispersion; and
    0.1 to 25% by weight of additional additives comprising a thickener, a dispersing agent, a defoamer, a pH adjuster, an organic solvent, a coalescent agent, a bactericide, a fungicide, or any combination thereof;
  (c) a stone-like topcoat system on the transparent overcoat, wherein the stone-like topcoat system comprises a multicolored spot layer and a background color layer;
  (d) an adhesive primer coat formed of a second coating composition on the stone-like topcoat system, wherein the second coating composition comprises an aqueous polymer dispersion selected from aqueous acrylic dispersions, aqueous organic silicone dispersions and aqueous vinyl acetate dispersions,
wherein the transparent overcoat in the multilayered laminate, when released from the support substrate, has a gloss of at least 60% at 60°.

2. The multilayered laminate according to claim 1, wherein the multicolored spot layer is formed from a third coating composition comprising color concentrate particles protected by a hydrophilic clay colloid and having one or more hues.

3. The multilayered laminate according to claim 2, wherein the third coating composition, based on the total weight of the third coating composition, comprises:
  45 to 85% by weight of an aqueous polymer dispersion;
  14.5 to 45% by weight of the color concentrate particles protected by hydrophilic clay colloid; and
  0.1 to 10% by weight of additional additives comprising a thickener, a dispersing agent, a defoamer, a pH adjuster, an organic solvent, a coalescent agent, a bactericide, a fungicide, or any combination thereof.

4. The multilayered laminate according to claim 2, wherein the color concentrate particles protected by a hydrophilic clay colloid are formed by mixing a protective hydrophilic clay into deionized water to form a hydrophilic clay colloid and mixing and pelletizing the hydrophilic clay colloid with a colored latex paint, in which the protective hydrophilic clay, deionized water and the colored latex paint are present in a mass ratio of 1:5-15:5-15.

5. The multilayered laminate according to claim 4, wherein the colored latex paint, based on the total weight of the colored latex paint, comprises
  90 to 99% by weight of a base latex paint,
  0.5 to 4% by weight of a hydrophilic clay; and
  0.01 to 8% by weight of a colorant for the multicolored spot layer.

6. The multilayered laminate according to claim 5, wherein the base latex paint contained in the colored latex paint, based on the total weight of the base latex paint, comprises
  60 to 85% by weight of an aqueous polymer dispersion; and
  15 to 40% by weight of additional additives comprising a filler, a thickener, a dispersing agent, a defoamer, a pH adjuster, an organic solvent, a coalescent agent, a bactericide, a fungicide, or any combination thereof.

7. The multilayered laminate according to claim 1, wherein the background color layer is formed from a fourth coating composition comprising mineral powders in the form of discrete particles, wherein the fourth coating composition, based on the total weight of the fourth coating composition, comprises
  14.5 to 80% by weight of an aqueous polymer dispersion;
  10 to 85% by weight of the mineral powders in the form of discrete particles;

0 to 10% by weight of a colorant for the background color layer; and to 10% by weight of additional additives comprising a thickener, a dispersing agent, a defoamer, a pH adjuster, an organic solvent, a coalescent agent, a silane coupling agent, a bactericide, a fungicide, or any combination thereof.

8. The multilayered laminate according to claim 7, wherein the colorant for the background color layer has a different hue from the colorant for the multicolored spot layer.

9. The multilayered laminate according to claim 1, wherein the second coating composition, relative to the total weight of the second coating composition, comprises 40 to 85% by weight of an aqueous polymer dispersion selected from aqueous acrylic dispersions, aqueous organic silicone dispersions and aqueous vinyl acetate-ethylene dispersions;

10 to 58% by weight of filler;

0.5 to 2.5% by weight of silane coupling agent; and 0.1 to 10% by weight of additional additives comprising a thickener, a dispersing agent, a defoamer, a pH adjuster, an organic solvent, a coalescent agent, a bactericide, a fungicide, or any combination thereof.

10. A process for the preparation of multilayered laminate according to claim 1, comprising;

(i) providing a support substrate having at least one releasable major surface;

(ii) applying a first coating composition on the releasable major surface of the support substrate to form a transparent overcoat, wherein the first coating composition comprises an aqueous polymer dispersion having a particle size in the range of 30 to 400 nm;

(iii) by wet on dry application process, forming a multicolored spot layer and a background color layer in turn on the transparent overcoat, thereby forming a stone-like topcoat system;

(iv) by wet on dry application process, applying a second coating composition on the stone-like topcoat system to form an adhesive primer coat, wherein the second coating composition comprises an aqueous polymer dispersion selected from aqueous acrylic dispersions, aqueous organic silicone dispersions, and aqueous vinyl acetate dispersions, thereby obtaining the multilayered laminate, wherein the transparent overcoat in the multilayered laminate, when released from the support substrate, has a gloss of at least 60% at 60°.

11. A process for coating a target substrate, comprising;

(i) attaching the multilayered laminate according to claim 1 via the adhesive primer coat to the surface of the target substrate;

(ii) releasing the support substrate from the multilayered laminate.

12. The process according to claim 11, wherein the target substrate comprises an architectural material selected from concrete mass, plaster board, lime-sand brick, aerated concrete, lightweight multilayer plate, fiber cement board or any combination thereof or wood-based substrate selected from natural wood substrate, synthetic or engineered wood-based substrate, or any combination thereof.

* * * * *